A. T. TIZARD.
TIRE.
APPLICATION FILED JULY 24, 1908.
941,289.
Patented Nov. 23, 1909.
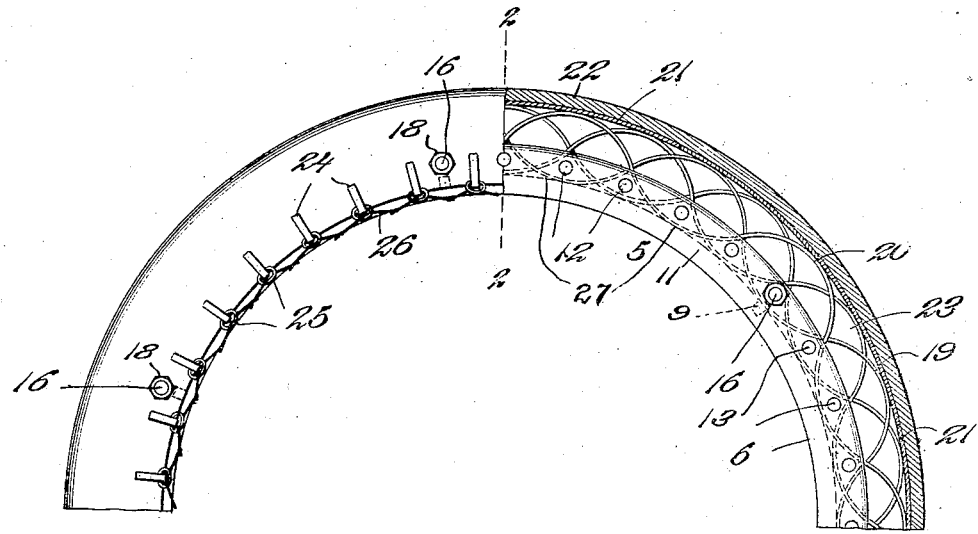
Fig. 1.
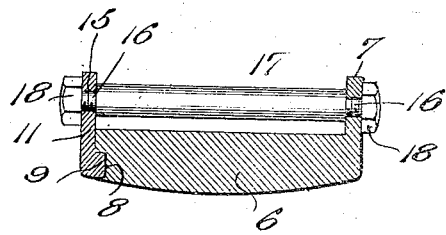
Fig. 2.
Fig. 3.
Witnesses
Phil E. Barnes
Inventor
Albert T Tizard
By Victor J. Evans
Attorney

UNITED STATES PATENT OFFICE.

ALBERT T. TIZARD, OF DURANGO, COLORADO.

TIRE.

941,289.

Specification of Letters Patent. Patented Nov. 23, 1909.

Application filed July 24, 1908. Serial No. 445,225.

*To all whom it may concern:*

Be it known that I, ALBERT T. TIZARD, a citizen of the United States, residing at Durango, in the county of La Plata and State of Colorado, have invented new and useful Improvements in Tires, of which the following is a specification.

This invention relates to automobile tires, and has for an object to provide a tire which will be simple in construction, and which will embody a plurality of springs carried by the rim of a wheel and which are protected or inclosed by a leather casing, thus providing a puncture proof tire.

A further object of the invention is to provide a casing of simple construction which may be conveniently applied to or removed from a wheel.

Other objects and advantages will be apparent as the nature of the invention is more fully disclosed, and it will of course be understood that certain changes in the structure of the invention may be resorted to within the scope of the appended claim.

In the drawings forming a portion of this specification, and in which like numerals of reference indicate similar parts in the several views, Figure 1 is partly a side view and partly a sectional view of a portion of a vehicle wheel disclosing the present invention. Fig. 2 is a sectional view on the line 2—2 of Fig. 1. Fig. 3 is a detail sectional view through a portion of the rim of the wheel.

Referring now more particularly to the drawings, there is shown a portion of a vehicle wheel 5 comprising a rim 6 having at one side an annular flange 7. The rim, at the other side is provided with a plurality of recesses 8 for receiving lugs or bosses 9 carried by a detachable flange 11. Each of the flanges 7 and 11 respectively is provided with a plurality of passages 12 for receiving trunnions 13 carried by pins or rollers 14. The flanges are also provided with similar passages 15 for receiving the threaded ends 16 formed on the ends of similar pins 17. The pins 14 and 17 are disposed in spaced relation to the outer surface of the rim 6 for a purpose to be hereinafter described. The threaded ends 16 of the pins 17 receive fastening nuts 18 for securely holding the detachable flange engaged with the rim, and to prevent displacement of the lugs 9 from the recesses 8. By engaging the lugs 9 in the recesses 8 formed in one side of the rim it is obvious that the flange 11 is held against rotation.

The rim 6 is provided with a plurality of flat corrugated leaf springs 19, the outwardly extending portion 20 of each spring contacting normally with an annular metallic lining formed of a plurality of segments 21 secured to the tread portion 22 of a casing. The tread portion 22 of the casing is provided with side walls or flaps 23 disposed at their lower ends outwardly of the flanges of the rim 6. The side walls or flanges have secured thereto members 24 in which are pivotally mounted rings 25, and through these rings a retaining cord or flexible element 26 is laced for retaining the casing to the rim. The inwardly directed portions 27 of the corrugated springs are passed beneath the pins 14 and 17 and are consequently held against casual displacement.

A tire and rim as herein set forth and described is extremely simple to manufacture, may be put upon the market at a small cost, is very elastic when in use, and may be assembled or disassembled by those unskilled in the manufacture of a device as described.

Having thus fully described the invention what is claimed as new is:

The combination with a vehicle rim provided with a fixed annular flange at one side and a removable annular flange at the other side, of an annular series of rollers journaled at their ends in said flanges and disposed in spaced relation to the inner surface of the rim, a casing provided with an annular tread portion disposed in spaced relation to the rollers and provided with parallel spaced side walls having their inner extremities disposed outwardly of the flanges of the rim, members carried by the walls of the casing and provided at their inner ends with pivotally mounted rings, a retaining cord laced through said rings to hold the casing to the rim, a metallic lining secured upon the inner side of the tread portion of the casing and comprising a series of sections secured to said tread portion and having their side edges terminating at points adjacent to the outer ends of the side walls of the casing, and an annular series of springs arranged parallel to each other and corrugated to provide inwardly directed curved portions engaged with the rim and disposed beneath the rollers, and outwardly directed curved portions engaged with the metallic lining for the casing.

In testimony whereof I affix my signature in presence of two witnesses.

ALBERT T. TIZARD.

Witnesses:
JOHN R. BALL,
ELMER E. PETERSON.